US009128730B2

(12) United States Patent
Yu

(10) Patent No.: US 9,128,730 B2
(45) Date of Patent: Sep. 8, 2015

(54) METHOD FOR EXECUTING BIOS TOOL PROGRAM IN NON-SMI MECHANISM

(71) Applicant: Insyde Software Corporation, Taipei (TW)

(72) Inventor: Li-Wei Yu, Taipei (TW)

(73) Assignee: INSYDE SOFTWARE CORPORATION, Taipei (TW)

( * ) Notice: Subject to any disclaimer, the term of this patent is extended or adjusted under 35 U.S.C. 154(b) by 316 days.

(21) Appl. No.: 13/900,300

(22) Filed: May 22, 2013

(65) Prior Publication Data
US 2013/0318336 A1 Nov. 28, 2013

(30) Foreign Application Priority Data
May 23, 2012 (TW) .............................. 101118266 A

(51) Int. Cl.
G06F 9/44 (2006.01)
(52) U.S. Cl.
CPC ............ *G06F 9/4406* (2013.01); *G06F 9/4401* (2013.01)

(58) Field of Classification Search
None
See application file for complete search history.

(56) References Cited

U.S. PATENT DOCUMENTS 6,219,742 B1 * 4/2001 Stanley .......................... 710/260
2009/0278679 A1 * 11/2009 Dailey et al. .................. 340/500
2012/0297224 A1 * 11/2012 Chen et al. .................... 713/322

* cited by examiner

*Primary Examiner* — Dennis M Butler
(74) *Attorney, Agent, or Firm* — Muncy, Geissler, Olds & Lowe, P.C.

(57) ABSTRACT

A method for executing a Basic Input Output System (BIOS) tool program in a non-System Management Interrupt (SMI) mechanism is applicable to a computer and includes: bi-directionally transmitting, by an ACPI ASL module and a service module, a corresponding trigger signal; bi-directionally transmitting, by the service module and a driver, the trigger signal; bi-directionally transmitting, by the driver and a real-time service module of a BIOS, the trigger signal; and performing, by the BIOS, event processing according to the trigger signal to obtain a processing result, or performing, by the BIOS, logic operation on the data to obtain operation data.

11 Claims, 3 Drawing Sheets

METHOD FOR EXECUTING BIOS TOOL PROGRAM IN NON-SMI MECHANISM

BACKGROUND OF THE INVENTION

1. Field of Invention

The present invention relates to a method for executing a Basic Input Output System (BIOS) tool program, and more particularly to a method for executing a BIOS tool program in a non-System Management Interrupt (SMI) mechanism.

2. Related Art

A System Management Mode (SMM) is a CPU execution mode introduced by Intel into x86 chip architecture after 386SL. In the SMM, a BIOS can only be entered through a System Management Interrupt (SMI) and exited by executing a Removable Storage Management (RSM) program instruction. The SMM is non-transparent to an operating system, that is, the operating system has no idea when to enter the SMM and cannot figure out whether the SMM is executed or not. To implement the SMM and provide a hardware SMI function, Intel adds a pin SMI#Pin to the CPU, and when the pin is at a high electric potential, the CPU enters the mode. During the SMM execution procedure, other procedures, including interrupts to the CPU, are all shielded. The SMM execution procedure is called an SMM processing procedure, and all the SMM processing procedures can only be carried out in the space of a System Management RAM (SMRAM). The SMM processing procedure can only be implemented by system firmware.

FIG. 1 is a schematic system block diagram of executing a BIOS tool program in an SMI mechanism in the prior art. When a Windows tool module 10 intends to call a function of an Extensible Firm Interface (EFI) BIOS 12, the Windows tool module 10 and an Advanced Configuration and Power Interface (ACPI) ACPI Source Language (ASL) module 14 are enabled to perform bi-directional communication through a Windows Management Instrumentation (WMI) interface 16 having a WMI BIOS tool program.

Currently, a hardware SMI is provided in the existing x86 chip architecture, and to perform message transmission with the EFI BIOS 12 or execute a BIOS function in, for example, an EFI Windows operating system, many existing WMI BIOS tool programs are connected to the EFI BIOS 12 for communication through first the ACPI ASL module 14 and then the SMI mechanism. However, new x86 System On Chip (SOC) architecture does not have the condition of providing a hardware SMI, thus it may result in execution failure of many WMI BIOS tool programs in the x86 SOC architecture unless the WMI BIOS tool program is rewritten.

SUMMARY OF THE INVENTION

To provide a substitutive solution, the present invention provides a method for executing a BIOS tool program in a non-SMI mechanism. The method can replace the original SMI transmission mechanism so that a connecting interface is established between a machine code in the ACPI ASL module and the BIOS, and the program of the original WMI BIOS tool module can still be successfully executed and maintain its original function in the x86 SOC architecture without being changed.

The present invention provides a method for executing a BIOS tool program in a non-SMI mechanism. The method is applicable to a computer and includes the following steps:

sending event information data corresponding to an event from an ACPI ASL module to a service module of a relay service layer;

transmitting the received event information data from the service module to a driver of the relay service layer;

transmitting the received event information data from the driver to the real-time service module of a BIOS;

performing, by the BIOS, event processing according to the event information data received by the real-time service module to obtain an event processing result;

transmitting the event processing result from the BIOS to the driver through the real-time service module;

transmitting the received event processing result from the driver to the service module; and transmitting the received event processing result from the service module to the ACPI ASL module.

The present invention also provides a computer readable recording medium with a program stored therein. After loading the program from the recording medium and executing the program, a computer is capable of performing the method for executing a BIOS tool program in a non-SMI mechanism.

The present invention also provides a computer program product with a program stored therein. After loading the program from the computer program product and executing the program, a computer is capable of performing the method for executing a BIOS tool program in a non-SMI mechanism.

DETAILED DESCRIPTION OF THE INVENTION

To make those skilled in the art to further understand the present invention, several embodiments with the accompanying drawings are provided below to describe in detail the content and efficacy of the present invention.

Figure 1:
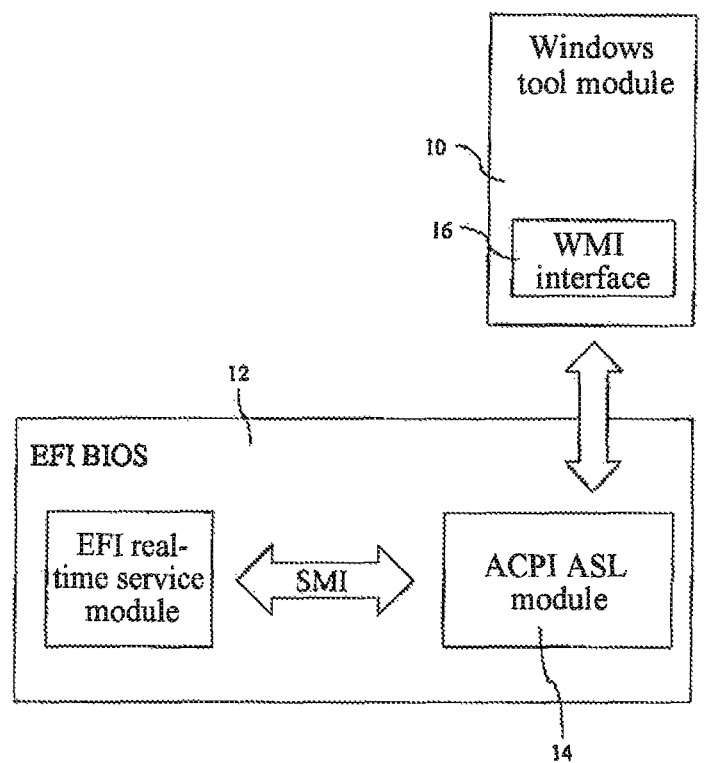
FIG. 1 is a schematic system block diagram of executing a BIOS tool program in an SMI mechanism in the prior art.
Figure 2:
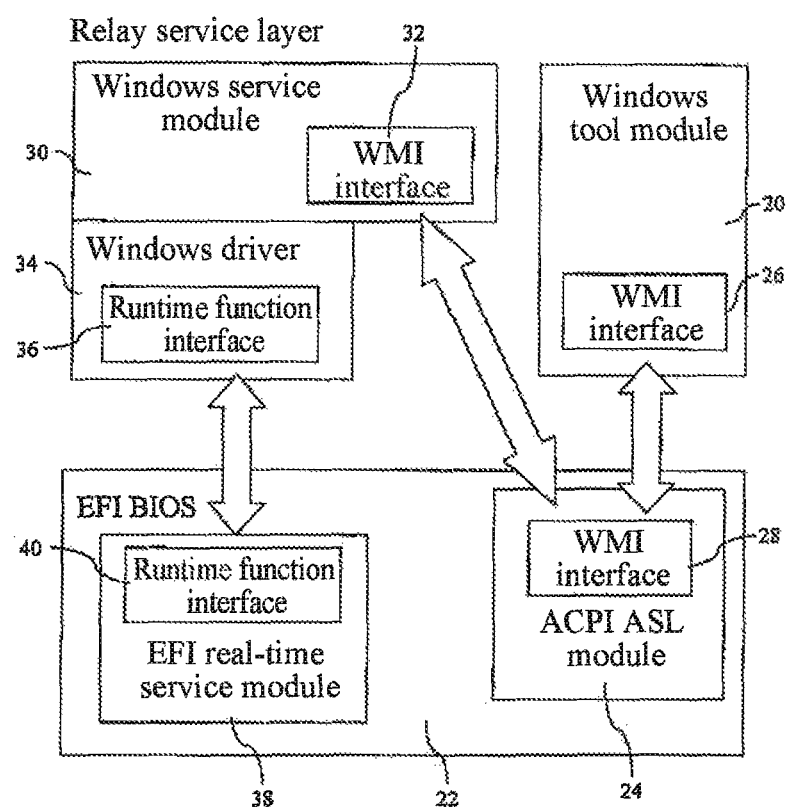
FIG. 2 is a schematic system block diagram of a method for executing a BIOS tool program in a non-SMI mechanism in the present invention.

FIG. 2 is a schematic system block diagram of a method for executing a BIOS tool program in a non-SMI mechanism in the present invention. The operation of each component in FIG. 2 is described in the following.

When an msconfig instruction is input into "start/run" of Windows XP, a "System Configuration Utility" dialog box is activated. A Windows tool program is generally used to manage a boot program and related settings as well as services started during the boot process. If the "Tools" tab is clicked, many tools and descriptions thereof are displayed on the screen. When one tool is selected, the name, path and related parameters of the program are displayed. For example, when the Windows tool program is initiated by pressing the keyboard or mouse, a Windows tool module 20 executes the Windows tool program to activate the tool.

When the Windows tool module 20 executes the Windows tool program to call a function of an EFI BIOS 22, the Windows tool module 20 sends a request for calling the EFI BIOS 22 to a WMI interface 28 of an ACPI ASL module 24 through a WMI interface 26 having a WMI BIOS tool program. The present invention is not limited to the EFI BIOS, and is applicable to a Universal Extensible Firm Interface (UEFI) BIOS or a legacy BIOS.

The ACPI is a management interface provided for an application of an operating system to manage all power sources, and serves as an industrial standard which includes specifications in terms of software and hardware.

The power management feature of the ACPI is applicable to a portable computer (for example, a laptop computer), a desktop computer, a workstation and a server. For example, a computer system may enter a minimum power consumption state by using the "Sleep" and "Hibernate" functions in the computer. The computer system in the sleep or hibernate state can be awakened by moving the mouse or pressing the keyboard, or by receiving a message from another computer (for example, being connected to a local area network) or in the presence of a major system error. When implemented in the BIOS and other system hardware, the ACPI may be triggered by the operating system.

The ACPI may implement the following functions:
System power management,
Device power management,
Processor power management,
Device and processor performance management,
Configuration/Plug and Play,
System Event,
Battery management,
Thermal management,
Embedded Controller, and
SMBus Controller.

The ACPI ASL module 24 receives, through the WMI interface 28 thereof, a call BIOS request, and executes a corresponding machine code according to the request to generate event information data. The event information data comprises an event trigger signal of an event, or the event trigger signal and event data. The ACPI ASL module 24 may perform a subsequent processing procedure on an event processing result, or the event processing result and event operation data to generate a request execution result, and transmit, through the WMI interface 28 thereof, the request execution result to the WMI interface 26 of the Windows tool module 20.

A Windows service module 30 of a relay service layer is connected, through a WMI interface 32 thereof, to the WMI interface 28 of the ACPI ASL module 24. The ACPI ASL module 24 sends, through the WMI interface 28 thereof, the event trigger signal corresponding to the event, or the event trigger signal and the event data to the WMI interface 32 of the Windows service module 30. The Windows service module 30 transmits the event trigger signal, or the event trigger signal and the event data, received through the WMI interface 32 thereof, to a Windows driver 34 of the relay service layer. The Windows driver 34 transmits the received event processing result, or the event processing result and the event operation data to the Windows service module 30 in a reverse direction.

A runtime function interface 36 of the Windows driver 34 is connected to a runtime function interface 40 of an EFI real-time service module 38 of the EFI BIOS 22. The Windows driver 34 transmits, through the runtime function interface 36 thereof, the received event trigger signal, or the event trigger signal and the event data to the runtime function interface 40 of the ER real-time service module 38 in a manner of driving the program.

The EFI BIOS 22 performs event processing according to the event trigger signal received through the runtime function interface 40 of the EFI real-time service module 38 to obtain an event processing result, or performs logic operation on the event data to obtain an event operation data. The EFI BIOS 22 transmits the event processing result, or the event processing result and the event operation data through the runtime function interface 40 of the EH real-time service module 38 to the runtime function interface 36 of the Windows driver 34 in a reverse direction.

The operating steps of the method for performing a BIOS tool program in a non-SMI mechanism according to the present invention is described in the following.

Figure 3:
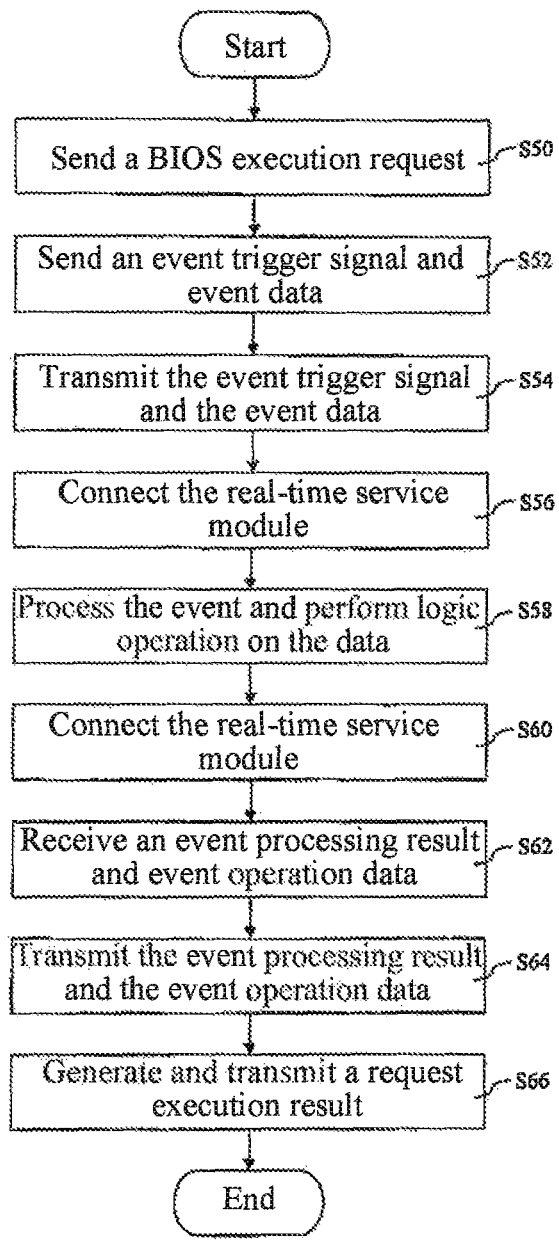
FIG. 3 is a flow chart of the method for executing a BIOS tool program in a non-SMI mechanism in the present invention.

FIG. 3 is a flow chart of the method for executing a BIOS tool program in a non-SMI mechanism in the present invention. The operating steps in FIG. 3 are described with reference to the components in FIG. 2.

In FIG. 3, when one tool in Windows XP is selected, the Windows tool module 20 executes the Windows tool program to activate the tool. When the Windows tool module 20 executes the Windows tool program to call a function of the EFI BIOS 22, the Windows tool module 20 sends a request for calling the EFI BIOS 22 to the WMI interface 28 of the ACPI ASL module 24 through the WMI interface 26 (Step S50).

The ACPI ASL module 24 receives, through the WMI interface 28 thereof, a call BIOS request, and executes a corresponding machine code according to the request to generate event information data. The event information data comprises an event trigger signal of an event, or the event trigger signal and event data. The ACPI ASL module 24 sends, through the WMI interface 28 thereof, the event trigger signal, or the event trigger signal and the event data to the WMI interface 32 of the Windows service module 30 of the relay service layer (Step S52).

The Windows service module 30 transmits the event trigger signal, or the event trigger signal and the event data, received through the WMI interface 32 thereof, to the Windows driver 34 of the relay service layer (Step S54). The runtime function interface 36 of the Windows driver 34 is connected to the runtime function interface 40 of the EFI real-time service module 38 of the EFI BIOS 22. The Windows driver 34 transmits, through the runtime function interface 36 thereof, the event trigger signal, or the event trigger signal and the event data to the runtime function interface 40 of the EFI real-time service module 38 in a manner of driving the program (Step S56).

The EFI BIOS 22 performs event processing according to the event trigger signal received through the runtime function interface 40 of the EFI real-time service module 38 to obtain an event processing result, or performs logic operation on the event data to obtain an event operation data (Step S58).

The runtime function interface 40 of the EFI real-time service module 38 is connected to the runtime function interface 36 of the Windows driver 34. The EFI BIOS 22 transmits the event processing result, or the event processing result and the event operation data through the runtime function interface 40 of the EFI real-time service module 38 to the runtime function interface 36 of the Windows driver 34 in a reverse direction (Step S60).

The Windows driver 34 transmits the received event processing result, or the event processing result and the event operation data to the Windows service module 30 in a reverse direction (Step S62). The Windows service module 30 transmits, through the WMI interface 32 thereof, the received event processing result, or the event processing result and the event operation data to the WMI interface 28 of the ACPI ASL module 24 in a reverse direction (Step S64).

The ACPI ASL module 24 performs a subsequent processing procedure on the event processing result, or the event processing result and the event operation data, received through the WMI interface 28 thereof, to generate a request execution result, and transmits, through the WMI interface 28 thereof, the request execution result to the WMI interface 26 of the Windows tool module 20 (Step S66).

The method for performing a BIOS tool program in a non-SMI mechanism according to the present invention may be composed in the form of a program, and the program may be stored in a computer readable recording medium. After loading the program from the computer readable recording medium and executing the program, a computer is capable of performing the steps of the method described above with the accompanying drawings.

Similarly, the method for performing a BIOS tool program in a non-SMI mechanism according to the present invention may be implemented through a computer program product. After loading the computer program product from, for example, a network and executing the computer program product, a computer is capable of performing the steps of the method described above with the accompanying drawings.

The present invention provides a method for performing a BIOS tool program in a non-SMI mechanism. In the method, the original SMI transmission mechanism is replaced by a relay service layer, a connecting interface of the relay service layer is established between a machine code in the ACPI ASL module and the BIOS, and the program of the original WMI BIOS tool module can still be successfully executed and maintain its original function in the x86 SOC architecture without being changed.

Although the present invention is described above through the preferred embodiments and the accompanying drawings, they are not intended to limit the present invention. Various modifications, omissions and changes made by those skilled in the art to the form and content of the embodiments still fall within the protection scope of the present invention.

What is claimed is:

1. A method for executing a Basic Input Output System (BIOS) tool program in a non-System Management Interrupt (SMI) mechanism, the method being applicable to a computer and comprising:
   sending event information data corresponding to an event from an ACPI ASL module to a service module of a relay service layer;
   transmitting the received event information data from the service module to a driver of the relay service layer;
   transmitting the received event information data from the driver to a real-time service module of a BIOS;
   performing, by the BIOS, event processing according to the event information data received by the real-time service module to obtain an event processing result;
   transmitting the event processing result from the BIOS to the driver through the real-time service module;
   transmitting the received event processing result from the driver to the service module; and
   transmitting the received event processing result from the service module to the ACPI ASL module.

2. The method according to claim 1, wherein the event information data corresponding to the event is generated by a call BIOS request received from a tool module.

3. The method according to claim 2, wherein when the event information data comprises an event trigger signal, the BIOS performers event processing according to the event trigger signal to obtain the event processing result.

4. The method according to claim 3, further comprising:
   generating a request execution result by the ACPI ASL module with a subsequent processing procedure on the received event processing result; and
   transmitting the request execution result from ACPI ASL module to the tool module.

5. The method according to claim 2, wherein when the event information data comprises an event trigger signal and event data, the BIOS performers event processing according to the event trigger signal to obtain the event processing result and logic operation on the event data to obtain event operation data.

6. The method according to claim 5, further comprising:
   generating a request execution result by the ACPI ASL module with a subsequent processing procedure on the received event processing result and event operation data; and
   transmitting the request execution result from ACPI ASL module to the tool module.

7. The method according to claim 2, wherein the tool module comprises a Windows Management Instrumentation (WMI) interface for communicating with a WMI interface of the ACPI ASL module.

8. The method according to claim 2, wherein the service module comprises a WMI interface for communicating with a WMI interface of the ACPI ASL module.

9. The method according to claim 2, wherein the driver comprises a runtime function interface for communicating with a runtime function interface of the real-time service module.

10. A computer readable recording medium with a program stored therein, wherein after loading the program from the recording medium and executing the program, a computer is capable of performing the method according to claim 1.

11. A computer program product with a program stored therein, wherein after loading the program from the computer program product and executing the program, a computer is capable of performing the method according to claim 1.

* * * * *